United States Patent
Inoue

(10) Patent No.: US 10,242,470 B2
(45) Date of Patent: Mar. 26, 2019

(54) ENERGY MANAGEMENT SYSTEM, DISPLAY CONTROL APPARATUS, DISPLAY METHOD, AND COMPUTER-READABLE STORAGE MEDIUM

(71) Applicant: YOKOGAWA ELECTRIC CORPORATION, Musashino-shi, Tokyo (JP)

(72) Inventor: Ken-ichi Inoue, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 128 days.

(21) Appl. No.: 14/849,693

(22) Filed: Sep. 10, 2015

(65) Prior Publication Data

US 2016/0093074 A1   Mar. 31, 2016

(30) Foreign Application Priority Data

Sep. 25, 2014   (JP) .................................. 2014-195343

(51) Int. Cl.
  G05F 1/66      (2006.01)
  G05B 15/02     (2006.01)
  G06T 11/20     (2006.01)

(52) U.S. Cl.
  CPC ............ *G06T 11/206* (2013.01); *G05B 15/02* (2013.01); *G05F 1/66* (2013.01)

(58) Field of Classification Search
  CPC .................................................. G06T 11/206
  See application file for complete search history.

(56) References Cited

U.S. PATENT DOCUMENTS

| 2004/0095349 A1  | 5/2004 | Bito et al. |
| 2012/0109392 A1* | 5/2012 | Hanks .................... H02J 3/008 |
|                  |        | 700/291 |

(Continued)

FOREIGN PATENT DOCUMENTS

| EP | 0921689 A2   | 6/1999 |
| JP | 11-168666 A  | 6/1999 |

(Continued)

OTHER PUBLICATIONS

Translation of JP02013222256A, Osawa Nanaho et al. Energy Usage Visualization Device and Method , Oct. 28, 2013.*

(Continued)

*Primary Examiner* — Kee M Tung
*Assistant Examiner* — Grace Q Li
(74) *Attorney, Agent, or Firm* — Sughrue Mion, PLLC

(57) ABSTRACT

An energy management system is provided. The system includes an information collector which is configured to collect a first information in accordance with elapsing of time, including information on energy consumption of a subject of energy management or information on factors involved in a change of the energy consumption; and a display controller which is configured to collate a second information in which is included the first information, which is collected by the information collector, or specified energy performance for each second unit divided by one or a plurality of boundaries of an operating status which changes in accordance with the elapsing of time of the subject of energy management for each first unit which is divided by one or a plurality of physical or logical boundaries of the subject of energy management, based on the first information collected by the information collector to be the first unit and the second unit to cause the collated result to be displayed on a display.

14 Claims, 10 Drawing Sheets

(56) References Cited

U.S. PATENT DOCUMENTS

| | | | |
|---|---|---|---|
| 2012/0166497 A1* | 6/2012 | Choi ................. | G06Q 10/00 |
| | | | 707/805 |
| 2015/0067556 A1* | 3/2015 | Tibrewal .......... | G06F 17/30598 |
| | | | 715/765 |
| 2016/0033946 A1* | 2/2016 | Zhu .................. | G05B 15/02 |
| | | | 700/275 |

FOREIGN PATENT DOCUMENTS

| | | |
|---|---|---|
| JP | 2001-356814 A | 12/2001 |
| JP | 2002-123530 A | 4/2002 |
| JP | 2013-222256 A | 10/2013 |

OTHER PUBLICATIONS

Yokogawa Electric Corporation, "Next-Generation Distributed-Type EMS Energy Managing System InfoEnergy (Registered Trademark)", 2004, p. 9, https://www.yokogawa.co.jp/pdf/provide/J/GW/Bulletin/0000024413/0/BU34P03A21-01.pdf ; Getting Whole View by Multiwindow.

\* cited by examiner

FIG. 5

| No | NAME | UPPER LEVEL | CONFIGURATION | ENERGY INFORMATION | RELEVANT VARIABLE 1 | RELEVANT VARIABLE 2 | STATUS INFORMATION |
|---|---|---|---|---|---|---|---|
| 1 | REACTION EQUIPMENT A | NONE | DIAGRAM 1 | E00100 | P00100 | TIC0009 | ST00100 |
| 1-1 | REACTION TANK A1 | 1 | DIAGRAM 1-1 | E00110 | P00110 | | ST00110 |
| 1-1-1 | AGITATION APPARATUS | 1-1 | DIAGRAM 1-1-1 | E00111 | TT0001 | | ST00111 |
| 1-1-2 | HEATING APPARATUS | 1-1 | DIAGRAM 1-1-2 | E00112 | TIC0001 | FIC0002 | ST00112 |

| No.1 REACTION EQUIPMENT A | ENERGY INFORMATION | RELEVANT VARIABLE 2 | STATUS INFORMATION |
|---|---|---|---|
|  | E100100 | TIC0009 | ST00100 |
| 2014 0208 0158 35 | 1040 | 76.0 | PRD XYZ PH2 |
| 2014 0208 0158 40 | 1050 | 79.5 | PRD XYZ PH2 |
|  |  |  |  |
| 2014 0208 0240 20 | 670 | 113.0 | PRD XYZ PH7 |
|  |  |  |  |
| 2014 0208 0421 15 | 45 | 32.7 | EXPORT |
|  |  |  |  |

FIG. 7

PHYSICAL BOUNDARY: NO.1 REACTION EQUIPMENT A
TIME BOUNDARY: PRD XYZ (PRODUCT XYZ DURING MANUFACTURING)

T3

| Item |  | unit | PH1 | PH2 | PH3 | PH4 | PH5 |
|---|---|---|---|---|---|---|---|
| EC00100 | Ave. | GJ | 45 | 1040 | 100 | 1750 | 2300 |
|  | Min | GJ | 20 | 60 | 90 | 1700 | 1800 |
|  | Max | GJ | 60 | 1750 | 110 | 1800 | 2600 |
|  | Δ | GJ | 40 | 1690 | 20 | 100 |  |
|  | Trend |  | 224XPQ | 224XPR | 224XPS | 224XPT |  |
| TIC0009 | Ave. | °C | 23 | 80 | 100.0 |  |  |
|  | Min | °C | 17 | 23 |  |  |  |
|  |  |  |  |  |  |  |  |

ENERGY MANAGEMENT SYSTEM, DISPLAY CONTROL APPARATUS, DISPLAY METHOD, AND COMPUTER-READABLE STORAGE MEDIUM

BACKGROUND OF THE INVENTION

Field of the Invention

Priorities are claimed on Japanese Patent Application No. 2014-195343, filed Sep. 25, 2014, the contents of which are incorporated herein by reference.

Embodiments of the present invention relate to energy management systems, display control apparatuses, display methods, and computer-readable storage media.

Related Art

In recent years, efficient use of limited resources is highly demanded and energy saving actions are being actively promoted. To promote the energy saving, visualization of energy performance such as energy consumption, energy efficiency, etc., in equipment or facilities is important. For example, to find a deviation from a target value or to check the effect of energy saving actions, changes in the energy efficiency and the energy consumption of the equipment or facilities, the effect of the energy saving actions, etc., are displayed on an energy management screen.

For example, the energy management screen may simultaneously display, on a time axis, specific energy consumption (energy consumption/production), which is one of the indicators of the energy efficiency; energy consumption; and production. Many of energy management software products that have functions which are equivalent thereto may check a time-series variation in the energy efficiency to perform target management and serve as a trigger which investigates a cause thereof at the time of the abnormality. Moreover, the energy management screen may have an accumulated value for one month plotted with points with the energy consumption on the vertical axis and relevant variables (production) on the horizontal axis. This management screen is widely used as what visually shows the energy efficiency (the relationship between the energy consumption and the relevant variables) and may display fixed energy (a base load) consumed even when the production is zero. Moreover, in the energy management screen, an estimated value and a measured value of the energy consumption are displayed such that they can be compared. For example, the estimated value is calculated from a mathematical expression which is modelled with the characteristic of the energy efficiency of a reference period. This management screen is widely used for the purpose of visualizing the effect of a policy for improving the energy efficiency. An example of the above-described energy management screen is described in ISO/DIS50006, for example.

Moreover, the energy management screen may simultaneously display an energy-saving management indicator (an energy efficiency indicator) as a part of a management information such as a safety information, a revenue and expenditure information, an inventory information, etc. In addition, the energy management screen may also simultaneously display a trend chart of the energy consumption and the conditions of use of the equipment (for example, "Next-generation distribution-type EMS Energy management system InfoEnergy (registered trademark) Yokogawa Electric Corporation" https://www.yokogawa.co.jp/pdf/provide/J/GW/Bulletin/0000024413/0/BU34P03A21-01.pdf, p. 9, "Getting Wholeview by Multiwindow") and information on the energy efficiency, etc., may also be displayed simultaneously in the overall arrangement diagram of the plant.

Now, the characteristics of the energy performance such as the energy consumption, the energy efficiency, etc., greatly differs depending on the operating status (during deactivation of the equipment, during activation of the equipment, during manufacturing of a product A, during manufacturing of a product B, etc.) that changes in time series in the equipment or facilities.

However, with the related-art energy management screen, it is difficult to focus on the relation of the operating status and the energy performance and compare the energy performance of the operating status which is equivalent in time series.

SUMMARY OF THE INVENTION

In view of the circumstance as described above, an object of the present invention is to provide energy management systems, display control apparatuses, display methods, and computer-readable storage media which make it possible to easily compare the energy performance to be managed at the equivalent operating statuses.

To solve the above-described problems, according to one embodiment of the present invention, an energy management system is provided, including: an information collector which is configured to collect a first information in accordance with elapsing of time; and a display controller which is configured to collate a second information to a plurality of first units which are divided by one or a plurality of physical or logical boundaries of a subject of energy management and a plurality of second units which are divided by one or a plurality of boundaries of an operating status to cause the collated result to be displayed on a display based on the first information collected by the information collector for each of the first units, the first information including information on energy consumption of the subject of energy management, or information on factors involved in a change of the energy consumption of the subject of energy management and the second information including the first information or specified energy performance for each of the second units divided by one or a plurality of boundaries of an operating status which changes in accordance with the elapsing of time of the subject of energy management.

Moreover, according to one embodiment of the present invention, the above-described energy management system is provided, wherein the display controller shows a third unit in which the first unit and the second unit are combined as a solid shape shown with a three-dimensional space which is configured by an X-axis and a Y-axis which are mutually orthogonal that correspond to the first unit and a Z-axis which corresponds to the second unit, and converts the third unit shown as the solid shape to a two-dimensional space display information to cause the converted result to be displayed on the display; and collates the second information corresponding to the third unit to the third unit to cause the collated result to be displayed on the display.

Furthermore, according to one embodiment of the present invention, the above-described energy management system is provided, wherein the display controller causes the second information corresponding to the third unit to be displayed on a portion corresponding to a surface of the third unit shown as the solid shape.

Moreover, according to one embodiment of the present invention, the above-described energy management system is provided, wherein the display controller shows the third unit as the hierarchical structure unit which is hierarchized to at least one of the first unit and the second unit.

Furthermore, according to one embodiment of the present invention, the above-described energy management system is provided, wherein the display controller draws out the hierarchical structure unit from the third unit to cause the drawn-out result to be displayed on the display and collates the second information corresponding to the hierarchical structure unit to the hierarchical structure unit to cause the collated result to be displayed thereon.

Moreover, according to one embodiment of the present invention, the above-described energy management system is provided, wherein the display controller shows the hierarchical structure unit as the solid shape in the same manner as the third unit, and causes the second information of the hierarchical structure unit to be displayed on a portion corresponding to a surface of the hierarchical structure unit shown as the solid shape.

Furthermore, according to one embodiment of the present invention, a display control apparatus is provided, including: a display controller which is configured to, based on a first information which is collected in accordance with elapsing of time, collate a second information to a plurality of first units and a plurality of second units to cause the collated result to be displayed on a display for each of the first units divided by one or a plurality of physical or logical boundaries of a subject of energy management, the first information including information on energy consumption of the subject of energy management, or information on factors involved in a change of the energy consumption of the subject of energy management, and the second information including the collected first information or specified energy performance for each of the second units divided by one or a plurality of boundaries of an operating status which changes in accordance with the elapsing of time of the subject of energy management.

Moreover, according to one embodiment of the present invention, a display method in an energy management system which collects a first information in accordance with elapsing of time, the first information including information on energy consumption of a subject of energy management, or information on factors involved in a change of the energy consumption of the subject of energy management, the display method comprising the step of collating a second information to a plurality of first units and a plurality of second units to cause the collated result to be displayed on a display based on the first information collected for each of the first units divided by one or a plurality of physical or logical boundaries of the subject of energy management and the second information including the first information or specified energy performance for each of the plurality of the second units divided by one or a plurality of boundaries of an operating status which changes in accordance with the elapsing of time of the subject of energy management.

Furthermore, according to one embodiment of the present invention, a non-transitory computer-readable storage medium which has stored thereon a computer program which causes a computer to execute the steps of: collecting a first information in accordance with elapsing of time; and collating a second information to a plurality of first units which are divided by one or a plurality of physical or logical boundaries of a subject of energy management and a plurality of second units which are divided by one or a plurality of boundaries of an operating status to cause the collated result to be displayed on a display based on the first information collected by the information collector for each of the first units, the first information including information on energy consumption of the subject of energy management, or information on factors involved in a change of the energy consumption of the subject of energy management and the second information including the first information or specified energy performance for each of the second units divided by one or a plurality of boundaries of an operating status which changes in accordance with the elapsing of time of the subject of energy management.

According to one embodiment of the present invention, an energy management system is provided, including: an information collector which is configured to collect a first information in accordance with elapsing of time; and a display controller which is configured to collate a second information to a plurality of first units which are divided by one or a plurality of physical or logical boundaries of a subject of energy management and a plurality of second units which are divided by one or a plurality of boundaries of an operating status to cause the collated result to be displayed on a display based on the first information collected by the information collector for each of the first units, the first information including information on energy consumption of the subject of energy management, or information on factors involved in a change of the energy consumption of the subject of energy management and the second information including the first information or specified energy performance for each of the second units divided by a one or a plurality of boundaries of an operating status which changes in accordance with the elapsing of time of the subject of energy management, wherein the display controller shows a third unit in which the first unit and the second unit are combined as a solid shape shown with a three-dimensional space which is configured by an X-axis and a Y-axis which are mutually orthogonal that correspond to the first unit and a Z-axis which corresponds to the second unit, and converts the third unit shown as the solid shape to a two-dimensional space display information to cause the converted result to be displayed on the display; and collates the second information corresponding to the third unit to the third unit to cause the collated result to be displayed on the display, and wherein the display controller causes the second information corresponding to the third unit to be displayed on a portion corresponding to a surface of the third unit shown as the solid shape.

Embodiments of the present invention make it possible to easily compare the energy performance to be managed at the equivalent operating statuses.

BRIEF DESCRIPTION OF THE DRAWINGS

FIG. 5 is a diagram illustrating one example of a physical boundary information table according to the present embodiment;

FIG. 6 is a diagram illustrating one example of a time boundary information table according to the present embodiment;

FIG. 7 is a diagram illustrating one example of a space-time boundary information table according to the present embodiment;

DETAILED DESCRIPTION OF THE INVENTION

Now an embodiment of the present invention is described with reference to the drawings.

(Overall Configuration Related to an Energy Management System 100)

Figure 1:
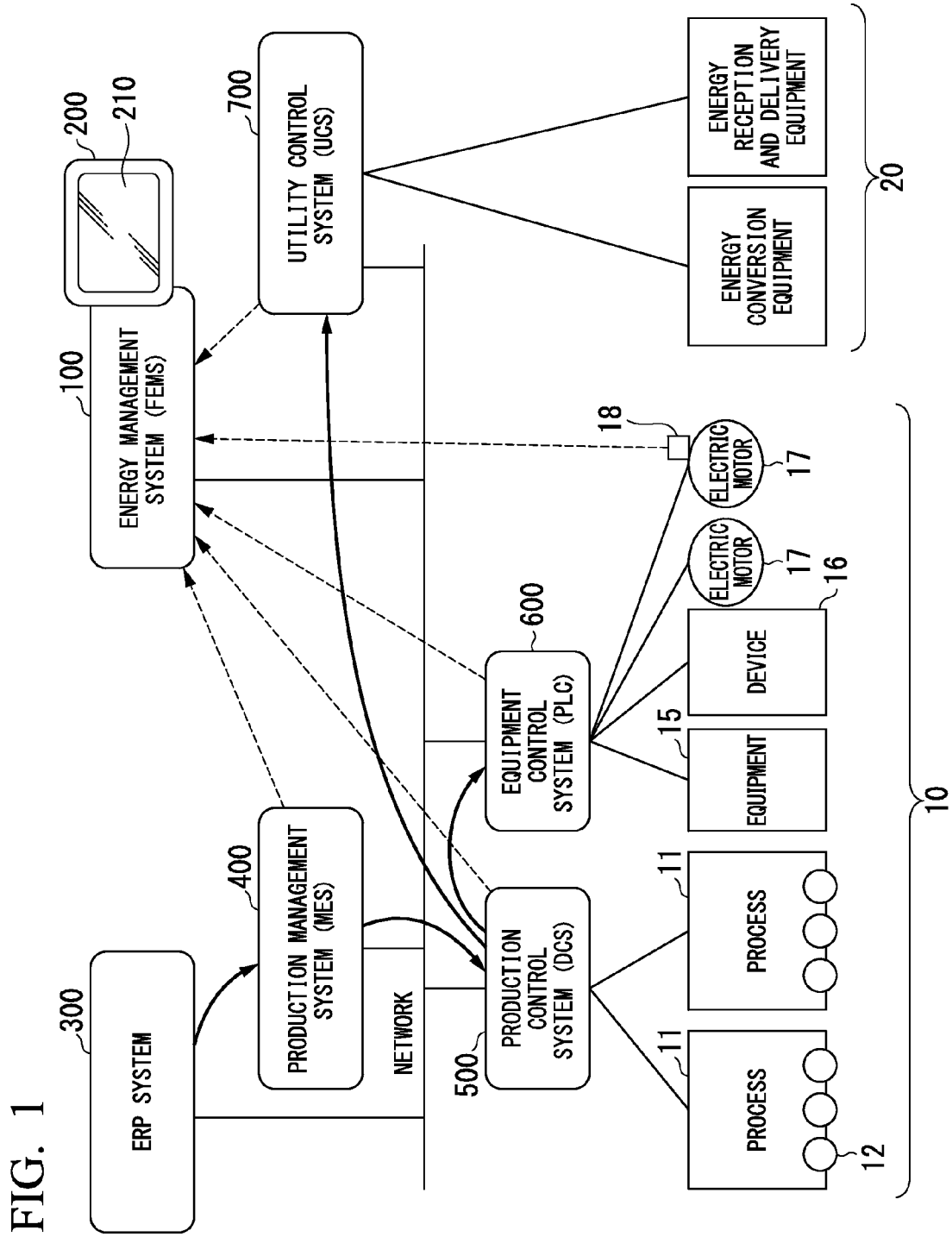
FIG. 1 is a configuration diagram illustrating one example of a configuration related to an energy management system according to the present embodiment.

FIG. 1 is a configuration diagram illustrating one example of a configuration related to an energy management system 100 according to the present embodiment. This FIG. 1 shows a relationship between a configuration of various systems in a production factory 10 and the energy management system 100 which displays energy performance and information which are collected from these systems. The energy management system 100 is, for example, an energy management software system (FEMS), and is hereinbelow described in detail with reference to FIG. 3.

Here, the "energy performance" is called energy consumption, energy efficiency, etc., in the same manner as the definition of ISO50001. Moreover, "energy" refers to electricity, fuels, steam, heat, compressed air, and other like media in the same manner as the definition of ISO50001.

The production factory 10, which is a facility (or a facility group) which manufactures products of multiple brands or a single brand, includes multiple manufacturing processes 11, equipment 15, a device 16, etc., and an electric motor 17 (a motor) which converts electric energy to mechanical energy to supply the converted result. For example, the production factory 10 is a semiconductor factory, a petrochemical factory, etc.

"Facilities", which are factory buildings or equipment units in the production factory 10, are, for example, an energy supply facility which supplies energy within the factory, a manufacturing facility in which are provided the manufacturing processes 11, the equipment 15, the device 16, etc., that manufacture products. The "equipment" may be grasped as a concept which is equal to the "facilities", or a concept which is smaller than the "facilities" that is provided in the "facilities". A "device", which is a generic name for an instrument, an appliance, and a mechanism, includes a motor, a pump, etc., as an example. Moreover, a collection of equipment units which have certain functions is also called "an apparatus".

An ERP (Enterprise Resource Planning) system 300 is a system in which various functions such as order receipt, purchasing, accounting, shipping, etc., that are required to carry out production in the production factory 10 are integrated. An order receipt information which is input in the ERP system 300 is delivered to a production management system 400 (MES) and compiled into a production plan. The production management system 400 controls the production factory 10 via a production control system 500 and an equipment control system 600 in accordance with the production plan compiled based on the order receipt information input from the ERP system 300. The production control system 500 is, for example, a distributed control system (DCS). Moreover, the equipment control system 600 is a programmable logic controller (PLC) system. In this way, manufacturing of a product is carried out at the production factory 10 based on the receipt information input in the ERP system 300.

The production control system 500 controls a manufacturing process using a field apparatus 12 which is arranged in a manufacturing process of the production factory 10. As the field apparatus 12, for example, a sensor equipment unit such as a flow rate meter, a temperature sensor, etc.; a valve equipment unit such as a flow-rate control valve, an open/close valve, etc.: an actuator equipment unit such as a fan, motor, etc.; an imaging equipment unit such as a camera, a video, etc., that images the condition and an object within a factory; an audio equipment unit such as a microphone, a speaker, etc., that collects abnormal noise within the factory, transmits an alarm sound, etc.; a position detection equipment unit which outputs a position information of the respective equipment units, and other equipment units may be applied.

The equipment control system 600 controls various devices 16 such as the equipment 15 of the production factory 10, the electric motor 17, etc. An utility control system 700 (UCS) controls utility equipment 20 such as energy conversion equipment 21, energy reception and delivery equipment 22, etc., and supplies energy such as electricity, fuels, steam, heat, compressed air, etc., to the production factory 10. The production control system 500 may also be used as the equipment control system 600.

The above-described respective systems are connected by a network. An instruction for production is dispatched from the production management system 400 to the production control system 500 which serves to direct execution of the overall production and from the production control system 500 to the equipment control system 600, the utility control system 700, etc. In accordance with the production plan of the multiple products, the production control system 500 and the equipment control system 600 operate the equipment 15 and the device 16 and a manufacturing process related to production to manufacture the product. For example, a reaction apparatus mixes predetermined materials at the predetermined time and temperature, reacts with precise temperature control, and is delivered after reaction completion. As a control pattern which operates the equipment 15 and devices 16 differs for each product manufactured, this control pattern, which is stored in the production control system 500 and the equipment control system 600, is activated at predetermined time and conditions by an instruction from the production management system 400.

The energy control system 100 collects information on the energy performance from the field equipment unit 12, or various control systems including the production management system 400, the production control system 500, and the equipment control system 600. Information on the energy performance includes information on the energy consumption, information called relevant variables closely associated with the energy consumption, for example.

For example, the energy consumption of the manufacturing process 11 is metered by the flow rate meter (one example of the field equipment unit 12) which measures the flow rate of the fuels, steam, etc., to be collected to the energy management system 100. Moreover, the electrical energy of the electrical motor 17 is, for example, metered by the electricity monitor 18 to be collected in the energy management system 100.

Moreover, the relevant variables which are closely associated with the energy consumption are information on a factor which is involved with a change in the energy consumption. Of the relevant variables, a product type information and a quantity information of a produced article (for example, a product) produced at the production factory 10 are collected in the energy management system 100 from the production management system 400 and the production control system 500. Furthermore, of the relevant variables, the production conditions such as a temperature, a pressure, a flow rate, etc., is collected to the energy management system 100 from a control system such as the production control system 500, the equipment control system 600, etc. Moreover, the supply of energy which is supplied from the utility equipment 20 to the production factory 10 is collected into the energy management system 100 from the utility control system 700.

The energy management system 100 collects information on energy performance (for example, information on energy consumption and on temperature, pressure, production, etc., related to the energy consumption), calculates energy performance on all or some of the production factory 10, which is a subject of energy management and causes the calculated result and collected information to be displayed on the display 210 of the information terminal 200. More specifically, for each unit divided by a physical or logical boundary of the production factory 10, the energy management system 100 causes the collected information or the energy performance for each unit divided by a boundary of the operating status in accordance with the transition in time of the production factory 10 to be displayed in the display 210 of the information terminal 200. In the explanations below, information collected from the respective systems of the production factory 10 by the energy management system 100 is also called "collected information".

Here, a unit which is divided by a physical boundary or a logical boundary of a subject of energy management is called a "physical boundary". For example, the physical boundary, which is a range divided by a physical boundary such as equipment, a device, etc., of the whole overall physical factory 10, or the equipment, the device, etc., of the production factory 10, is set as a subject range of energy management set in accordance with objectives of energy management. For example, the physical boundary is set as a range which includes a manufacturing process 11, equipment 15, a device 16, etc., for manufacturing a certain product, a factory building (facility) within the production factory 10, and, moreover, set as a range which includes the manufacturing process 11, equipment 15, device 16, etc., of a portion of the step which manufactures that product.

Figure 2:
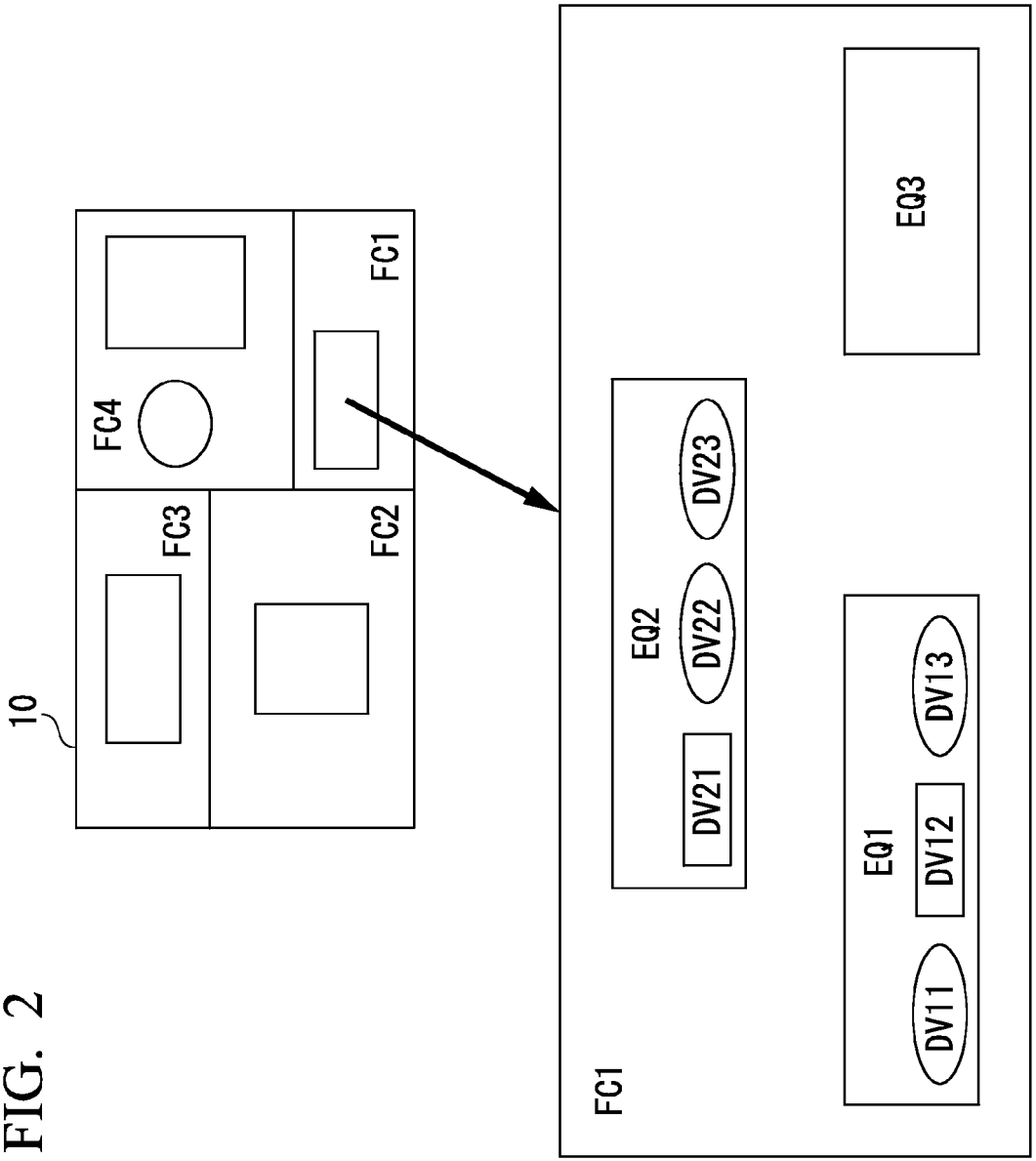
FIG. 2 is a sketch within a production factory.

FIG. 2 is one example of a sketch within the production factory 10. The production factory 10 is configured to include multiple facilities FC1, FC2, FC3, and FC4 such as a factory building, etc. The facility FC1 includes multiple equipment units (an equipment unit EQ1, an equipment unit EQ2, an equipment unit EQ3). Moreover, multiple devices (a device DV11, a device DV12, a device DV13) are included in the equipment unit EQ1. Furthermore, multiple devices (a device DV21, a device DV22, a device DV23) are included in the equipment unit EQ2. In the production facility 10 configured in this manner, a physical boundary as a unit of a range to be a subject of energy management is set in accordance with objectives of energy management. For example, the facility FC1 is set as a physical boundary, one of the equipment units included in the facility FC1 is set as a physical boundary, or multiple equipment unit groups are set as a physical boundary. Moreover, one of the devices included in the equipment unit EQ1 is set as a physical boundary and multiple equipment unit groups are set as a physical boundary.

The physical boundary, in which is included multiple types of subjects to be managed, such as the facility, the equipment unit, the device, etc., may be set. Moreover, the physical boundary may be a unit (a unit divided by a logical boundary) which is divided by a division, a section, etc., based on an organization chart of the production factory 10.

Moreover, a unit which is divided by the transition in time of a subject of energy management is called "a time boundary". The time boundary, which is a unit divided by a boundary of the operating status in accordance with the transition in time of the respective physical boundaries, and may be "during deactivation of the equipment unit", "during activation of the equipment unit", "during manufacturing of the product", etc., for example.

Moreover, physical (or logical) boundaries between space and time, in which a physical boundary and a time boundary are combined are called "spacetime boundaries". The energy management system 100 according to the present embodiment controls the energy performance or collected information on the time boundary for each physical boundary such that it is collated to the spacetime boundary to cause the collated result to be displayed on the display 210 of the information terminal 200.

A division of these boundaries may be set at an arbitrary granularity in alignment with exhaustiveness or an objective of energy management at the respective boundaries. Moreover, these boundaries may be hierarchically configured from overview to detail. For example, in a certain production equipment unit within a certain facility, the energy consumption is very large, so that the physical boundaries are divided into a detailed level to an apparatus as the element, and, moreover, to the equipment of that element to hierarchize, and the time boundary is also divided in detail to hierarchize the divided result. However, in a different production equipment unit, the physical boundary is not divided further, and also proper use is made of the time boundary such that the time boundary is also divided into only two types of during operation and during deactivation.

(Configuration of Energy Management System 100)

Figure 3:
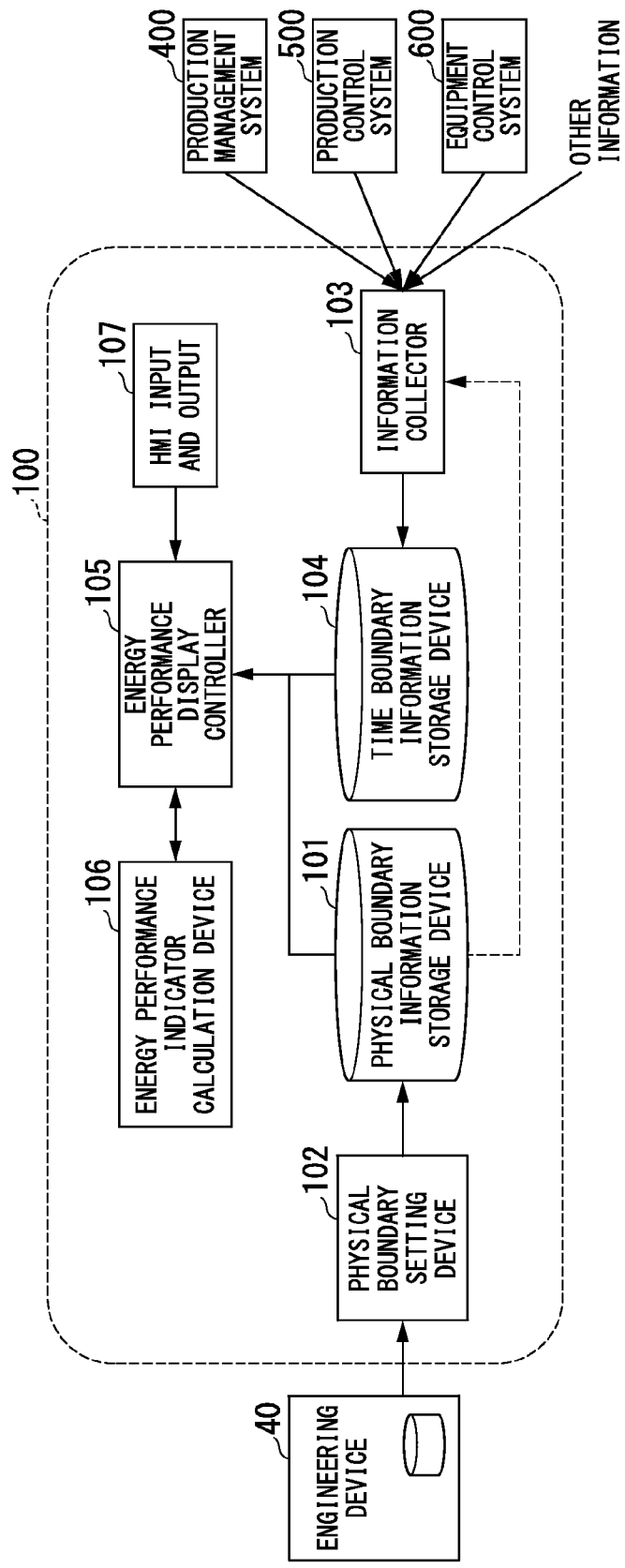
FIG. 3 is a configuration diagram illustrating one example of an overview configuration of an energy management system according to the present embodiment.

FIG. 3 is a configuration diagram illustrating one example of an overview configuration of the energy management system 100 according to the present embodiment. The energy management system 100 includes a physical boundary information storage device 101, a physical boundary setting device 102, an information collector 103, a time boundary information storage device 104, an energy performance display controller 105, an energy performance indicator calculation device 106, and an HMI (Human Machine Interface) input/output device 107.

In the physical boundary information storage device 101, a physical boundary information based on a piping diagram, a configuration diagram, a photograph, an organization chart, etc., of the production factory 10 is recorded in information on a hierarchical parent-child relationship of the physical boundary, information on energy data and relevant variables data, for example, information such as industrial unit and range, a data access method, a measurement period, etc., and, further, a status transition table of this physical boundary. Such a physical boundary information is set by the physical boundary setting device 102, and stored in the physical boundary information storage device 101. For example, based on an instruction and information input by an operation of an administrator of the energy management system 100, the physical boundary setting device 102 sets the physical boundary information. The physical boundary setting device 102 may use a configuration information on the equipment unit of the production factory 10, the status transition table, various setting information sets, for example, information such as a tag information, an industrial unit, a range, a data access method, etc., that is stored in an engineering device 40 of the production management system 400 or the production control system 500.

Figure 4:
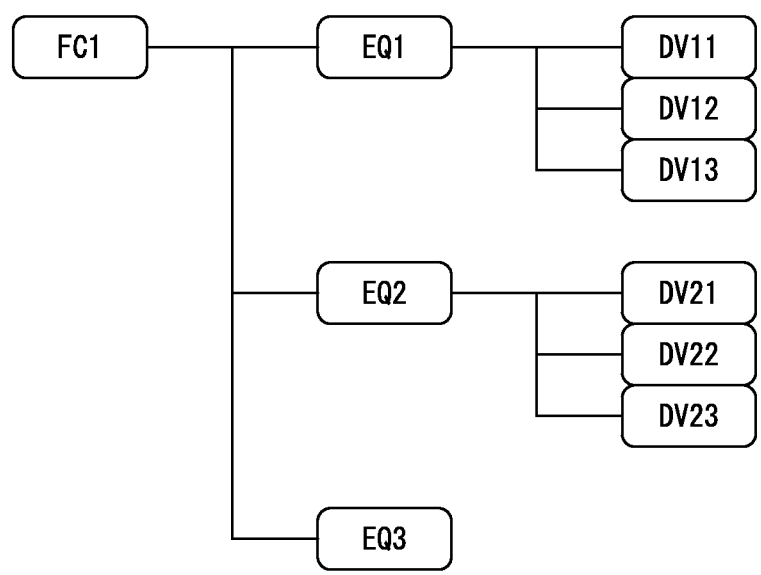
FIG. 4 is a diagram illustrating one example of a configuration information of equipment of a production factory.

FIG. 4 is a diagram illustrating one example of a configuration information of an equipment unit of the production factory 10. This diagram shows one example of a configuration information in which is shown what parent-child relationship the equipment units EQ1-3 included in the facility FC1 such as a factory building of the production factory 10, etc., the devices DV21-23, the devices DV11-13 included within various equipment units etc., are configured with. In an example shown in this diagram, the facility FC1 is an uppermost-level parent, and the equipment units EQ1-3 belong thereto as a lower level (child) of the facility FC1. Moreover, each of the devices DV11-13 belongs as a lower level of the equipment unit EQ1. Moreover, each of the devices DV21-23 belongs as a lower level of the equipment unit EQ2. The configuration information on the equipment units of the production factory 10 may be not only such a physical configuration, but also an instrumentation diagram, etc., which makes it possible to simultaneously show the flow of processing of a product produced.

FIG. 5 is a diagram illustrating one example of a physical boundary information table T1 which describes an element within a physical boundary stored in the physical boundary information storage device 101. As shown, the physical boundary information table T1 represents data of a two-dimensional table format including rows and columns that have columns of different fields of "No. (Number)", "name", "upper level", "configuration", "energy information", "relevant variable 1", "relevant variable 2", and "status information". In other words, in this example, the physical boundary information includes "No.", "name", "upper level", "configuration", "energy information", "relevant variable 1", "relevant variable 2", and "status information".

The "No. (Number)" is a number which identifies a physical boundary. The "name" is a name of the physical boundary, for example, a name of the equipment 15, the device 16, etc. In the "upper level", which represents information indicating an upper-level (parent) of the physical boundary, is stored the "No. (Number)" of the physical boundary to be an upper level, for example.

To the "configuration" is linked a diagram and a photograph showing a configuration of the physical boundary. For example, in the "configuration" is stored a link information showing a link destination of a photograph such as the equipment 15, the device 16, etc., that are included in the physical boundary, the instrument diagram in which the configuration of the physical boundary is described.

To the "energy information" is linked an energy information such as information on energy consumption at the physical boundary. In the "relevant variable 1" and "relevant variable 2" are linked relevant variables which are closely related to the energy consumption in the physical boundary. To each of the "energy information", and the "relevant variable 1" and the "relevant variable 2" are linked a tag number of each of the energy information and the relevant variables (a logical address of information on a status, etc., of the equipment 15 and the device 16, or the field equipment 12 that is collected and controlled by the production control system 500 or the equipment control system 600).

Figure 11:
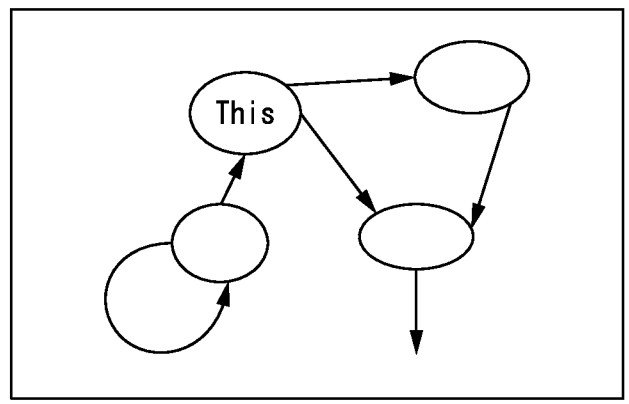
FIG. 11 is a diagram illustrating a first example of a status transition diagram of the equipment or a facility.
Figure 12:
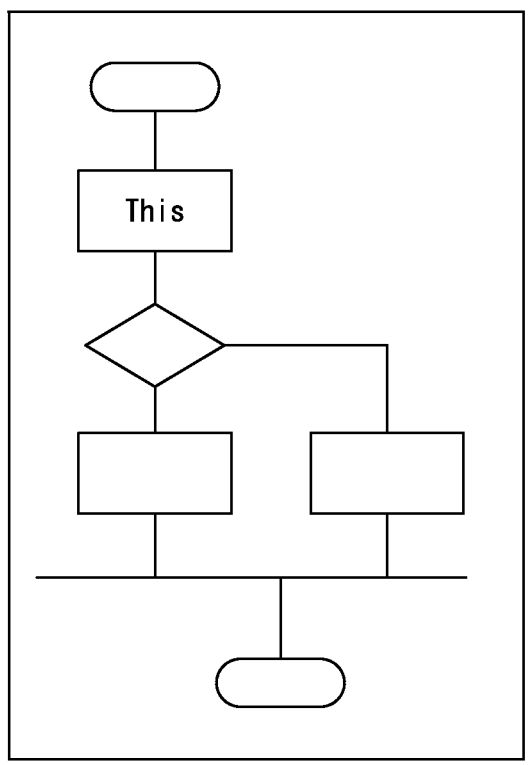
FIG. 12 is a diagram illustrating a second example of the status transition diagram of the equipment or the facility.

In the "status information" is stored information indicating the current status (the status) in a status transition diagram of the physical boundary. In the "status information" may be linked the status transition diagram (for example, see below-described FIGS. 11 and 12) in which information indicating the current status (the status) is included.

For example, with respect to the element of the physical boundary of "No. 1" on the first line of the physical boundary information table T1, the "name" is "reaction equipment A", the "upper level" is "none" (in other words, the uppermost-level physical boundary), the "configuration" is "diagram 1", the "energy information" is "E00100", the "relevant variable 1" is "P00100", the "relevant variable 2" is "TIC0009", and the "status information" is "ST00100". For example, information on "TIC0009" of the "relevant variable 2" is information on temperature.

Moreover, with respect to the element of the physical boundary of "No. 1-1" on the second line of the physical boundary information table T1, the "name" is "a reaction tank A1", the "upper level" is "1", the "configuration" is "diagram 1-1", the "energy information" is "E00110", the "relevant variable 1" is "P00100", and the "status information" is "ST00100".

Furthermore, with respect to the element of the physical boundary of "No. 1-1-1" on the third line of the physical boundary information table T1, the "name" is "a stirring apparatus", the "upper level" is "1-1", the "configuration" is "diagram 1-1-1", the "energy information" is "E00111", the "relevant variable 1" is "TT0001", and the "status information" is "ST00111".

Moreover, with respect to the element of the physical boundary of "No. 1-1-2" on the fourth line of the physical boundary information table T1, the "name" is "a heating apparatus", the "upper level" is "1-1", the "configuration" is "diagram 1-1-2", the "energy information" is "E00112", the "relevant variable 1" is "TIC0001", the "relevant variable 2" is "FIC0002", and the "status information" is "ST00112".

The parent-child relationship of the physical boundary shown in the FIG. 5 is such that, with reference to the elements "No." and "upper level", the reaction equipment A (upper level: none) is the uppermost level, a reaction tank A1 (upper level: 1) belongs to the reaction equipment A (No. 1) as a lower level thereof, and an agitating apparatus (upper level: 1-1) and a heating apparatus (upper level: 1-1) belong as a lower level of the reaction tank A1 (No. 1-1). For example, when applied to the parent-child relationship shown in FIG. 4, the reaction equipment A corresponds to the facility FC1, the reaction tank A1 corresponds to the equipment unit EQ1, and the agitating apparatus and the heating apparatus correspond to the device DV11 and the device DV12.

Returning to FIG. 3, the information collector 103 refers to a physical boundary information stored in the physical boundary information storage device 101 to collect information related to energy performance of the physical boundary from the production management system 400, the production control system 500, and the equipment control system 600. For example, the information collector 103 acquires information on the energy performance of the physical boundary periodically or at the timing of the status change from the above-described respective systems. The information collector 103 collects other information (for example, information from the electricity monitor 18 of the production factory 10) from sources other than the production management system 400, the production control system 500, and the equipment control system 600.

In the time boundary information storage device 104 is stored a time boundary information indicating the temporal transition on information related to the energy performance included in the respective physical boundaries. For example, in the time boundary information storage device 104 are stored, as a time boundary information, the data group acquired in units of one second, for example, as a trend information and a representative value such as the maximum value and the mean of the relevant variables and the energy consumption within the respective periods divided by the operating status in accordance with the operating status in accordance with the transition of the time of the respective physical boundaries, or, in other words, "during deactivation of the equipment", "during activation of the equipment", "during manufacturing of the product", etc. These time boundary information sets are information sets which are calculated based on energy performance indicators or information collected in accordance with the physical boundary information from the production management system 400, the production control system 500, and the equipment control system 600, etc., by the information collector 103.

For example, the operating status (the status) of a certain equipment unit 15 is actual performance information on the production management system 400, or is acquired from the production control system 500. Moreover, the energy consumption and the relevant variables such as the temperature, etc., may be acquired from the production control system 500, the equipment control system 600, etc.

FIG. 6 is a diagram illustrating one example of a time boundary information table T2 which is stored in the time boundary information storage device 104. Information on each physical boundary which is collected by the information collector 103 is stored in the time boundary information table T2. In the time boundary information table T2 shown in FIG. 6 is shown one example of information on "the reaction equipment A" of "No. 1" shown in FIG. 5. The first line of the time boundary information table T2 is information at 1:58:35 on Feb. 8, 2014, the operating status of the equipment (a status information (ST00100)) is a second phase (PRD XYZ PH2) during manufacturing of a product XYZ, the energy consumption (EC00100) then is "1040", and the relevant variable 2 (TIC0009) is "76.0". This second phase represents that the temperature is being increased. In the information at 1:58:40 on the second line, the relevant variable 2 (TIC0009) is increased to "79.5". The relevant variable 2 is information on the temperature, for example.

Moreover, in the information at 2:40:20 on the fourth line of the time boundary information table T2, the operating status (a status information (ST00100)) of the equipment is information on a time period during agitation (PRD XYZ PH7) in the seventh phase during manufacturing of the product XYZ. The sixth line shows that it is information on 4:21:15, that manufacturing of the product is completed, and that the operating status (a status information (ST00100)) is EXPORT. A blank row in the time boundary information T2 shown in this diagram represents that the description of information is omitted.

The time boundary information table T2 shown in FIG. 6 also represents that information collected in a certain physical boundary is recorded in time series. However, when wishing to focus only on the specific operating status, etc., a table may be searched and establishment of a display performance may be difficult. Therefore, taking into account the display performance, recording may be made collectively for each spacetime boundary in which a physical boundary and a time boundary are combined, or recording may be made after statistical processes such as mean, maximum value processes, etc., are performed in advance to reduce the data amount.

FIG. 7 is a diagram illustrating one example of a spacetime boundary information table T3 which is collectively stored for each spacetime boundary. An example shown in this diagram is a format in which are recorded for each "PH1, PH2", which is a sub-status of "manufacturing a product XYZ", mean, a minimum value, etc., such as a relevant variable (E100100), etc., in a certain spacetime boundary (a physical boundary is "No. 1 reaction equipment A" and a time boundary is "PRD XYA (manufacturing a product XYZ)". Here, the "PH1, PH2" indicates that the respective letters are spacetime boundaries and that a trend information acquired in one second periods in the "PH1" is recorded as a file "224XPQ" for the relevant variable (E100100), for example, as a detailed information thereof. A blank cell in a certain spacetime boundary information table T3 shown in FIG. 7 represents that the description of information is omitted.

Moreover, while an example of information of "manufacturing" is shown in an example shown in FIG. 7, it is limited thereto, so that information on "during deactivation of equipment", "during activation of equipment" may also be stored for each spacetime boundary.

In an example shown in FIGS. 6 and 7 is shown an example in which information collected by the information collector 103 is stored, information collected is added to information on which information processing (for example, a calculation process on an energy performance indicator) is performed to store the added information. Moreover, with information collected by the information collector 103 being stored, information processing may be performed on the stored information when the energy performance display controller 105 performs display control.

The energy performance display controller 105 reads a physical boundary information and a time boundary information linked thereto from the physical boundary information storage device 101 and the time boundary information storage device 104 and adds, thereto, an energy performance indicator, etc., that is calculated by the energy performance indicator calculation device 106, and generates a display information on a collected information or energy performance using the spacetime boundary. Then, the energy performance display controller 105 outputs a display information generated to the HMI input/output 107 to an information terminal 200 and causes the output result to be displayed in a display 210 of the information terminal 200.

For example, the energy performance display controller 105 causes the energy performance or the collected information to be 3D displayed on the display 210 of the information terminal 200. The "3D display" here refers to displaying a solid represented by a three-dimensional space as display information on a two-dimensional space projected on a plane from an arbitrary viewpoint. In other words, "the 3D display" refers to displaying the solid on the display 210, which is a two-dimensional plane. A display scheme may also be adopted such that separate images are shown onto left and right eyes to provide solidity.

More specifically, the energy performance display controller 105 shows a spacetime boundary in which the physical boundary and the time boundary are combined as a solid shape in a three-dimensional space. Then, the energy performance display controller 105 converts the spacetime boundary shown as the solid shape to cause the converted result to be displayed on the display 210, which is a two-dimensional display.

Moreover, the energy performance display controller 105 collates a collected information or energy performance on the time boundary in the physical boundary to a display information on the spacetime boundary as a collected information or energy performance corresponding to the spacetime boundary in which the physical boundary thereof and the time boundary thereof are combined. In this way, the energy performance display controller 105 generates a display information for causing the collected information or energy performance using the spacetime boundary to be displayed on the display 210 of the information terminal 200.

Furthermore, the energy performance display controller 105 may rotate a collected information or energy performance in accordance with the spacetime boundary displayed in 3D by the operation information accepted by the information terminal 200 to cause the rotated result to be displayed on the display 210 of the information terminal 200, or may hierarchically delve in the spacetime boundary to cause a detailed information to be displayed (drilled down). This 3D display may be displayed as a screen of the energy management system 100 (FEMS), or may be integrated with a management screen of the production management system 400 or the production control system 500, for example, a different system via a network.

The energy performance indicator calculation device 106 calculates an energy performance indicator as energy performance based on a physical boundary information and a time boundary information acquired via the energy performance display controller 105. The energy performance indicator, which is a quantitative value or scale of the energy performance, which is "annual energy consumption", "energy consumption per production", etc., for example, is shown in ISO50006. This energy performance indicator is set and visualized in accordance with an objective of a subject of energy management. For example, based on the energy performance indicator, the energy performance indicator calculation device 106 calculates the specific energy consumption of a certain physical boundary as an energy performance indicator based on information collected by the information collector 103 based on the energy performance indicator.

The HMI input/output 107 is an interface for transmitting and receiving information with the information terminal 200. For example, the HMI input/output 107 receives an operation information accepted by the information terminal 200 or outputs the display information generated by the energy performance display control device 105 to the information terminal 200.

(Exemplary 3D Display of Spacetime Boundary)

Next, explanations are given for an exemplary display of a collected information or energy performance using a spacetime boundary that causes the energy management system 100 to be displayed on the display 210 of the information terminal 200.

Figure 8:
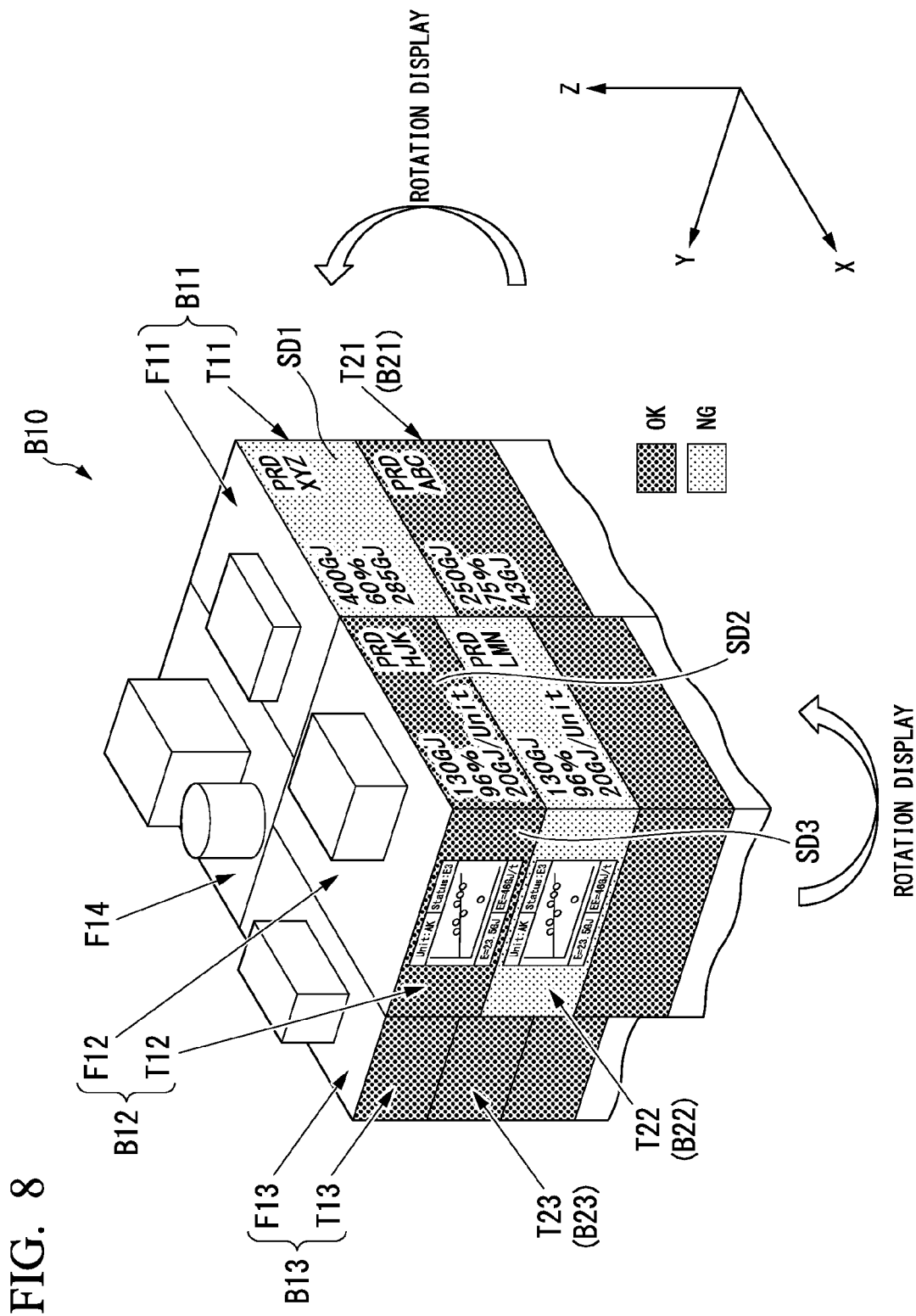
FIG. 8 is a diagram illustrating an exemplary display of information on energy performance according to the present embodiment.

FIG. 8 is a diagram illustrating an exemplary display of energy performance or a collected information. In FIG. 8, a spacetime boundary B10 of a subject of energy management (for example, the production factory 10) is 3D displayed. Here, an X-axis and a Y-axis that are orthogonal to each other are determined in parallel to an upper face of the spacetime boundary B10, and a Z-axis is determined in the direction which is orthogonal to this upper face. Moreover, the Z-axis is a time axis. In other words, the X-axis and the Y-axis correspond to the physical boundary, while the Z-axis corresponds to the time boundary. The spacetime boundary is shown as a cube, which is a solid, in a three-dimensional space configured by this X-axis, Y-axis, and Z-axis, and is converted to a two-dimensional space display information to cause the converted result to be displayed.

The spacetime boundary B10 shows the whole of the subject of energy management. An upper face of the spacetime boundary B10 shows a physical arrangement such as a facility, equipment, an apparatus, a device, etc., within the production factory 10. Here, a pipe diagram, a configuration diagram, a photograph, an organization chart, etc., of the production factory 10 (for example, a plant) are displayed and the displayed result (for example, the physical boundary F11, F12, F13, F14) is divided by the physical or logical boundary. For example, the facilities FC1, FC2, FC3, and FC4 shown in FIG. 2 correspond to the physical boundaries F11, F12, F13, and F14.

Moreover, in the Z-axis direction, divisions are made into multiple time boundaries by a boundary of the operating status of the respective physical boundaries. For example, the physical boundary F11 is divided into time boundaries T11, T21, . . . The physical boundary F12 is divided into time boundaries T12, T22, . . . . The physical boundary F13 is divided into time boundaries T13, T23, . . . .

Furthermore, the upper direction in the Z-axis is a direction at which time progresses. In other words, the uppermost time boundary (for example, time boundaries T11, T12, T13) shows the most recent (for example, current) operating status. For example, it is clear that the physical boundary F11, in which the current (time boundary T11) operating status is during manufacturing (PRD XYZ) of the product XYZ and the previous (time boundary T21) operating status is during manufacturing (PRD ABC) of the product ABC. Moreover, in an example shown in this diagram, an operating status for each physical boundary changes independently. The uppermost time boundary may be an arbitrary time, or, for example, the uppermost spacetime boundary may be a future image based on a production plan.

In this way, a subject of energy management is displayed as a spacetime boundary which is shown as a combination between the physical boundary and the time boundary. One solid which is shown as a solid in a combination between one physical boundary and one time boundary corresponds to one spacetime boundary.

For example, a combination of the physical boundary F11 and the time boundary T11 is a spacetime boundary B11 and a combination of the physical boundary F11 and the time boundary T21 is a spacetime boundary B21. Moreover, a combination of the physical boundary F12 and the time boundary T12 is a spacetime boundary B12 and a combination of the physical boundary F12 and the time boundary T22 is a spacetime boundary B22. Moreover, a combination of the physical boundary F13 and the time boundary T13 is a spacetime boundary B13, while a combination of the physical boundary F13 and the time boundary T23 is a spacetime boundary B23.

In other words, the spacetime boundary B10 is configured as a solid in a three-dimensional space by multiple spacetime boundaries (for example, a spacetime boundary B11, B12, . . . ). The 3D display of the spacetime boundary B10 configured in this way can rotate arbitrarily to display the rotated result and even a spacetime boundary which may not be viewed from one viewpoint such as the back side, etc., may be displayed such that it is seen by rotating the spacetime boundary to display the rotated result.

Energy performance or a collected information of the spacetime boundary is displayed in the position corresponding to the respective surfaces of the spacetime boundaries displayed in 3D along with the operating status (the status). For example, on a side face SD1 of the spacetime boundary B11 are displayed energy consumption "400 GJ", target ratio "60%", energy savings "285 GJ" as well as a display information "PRD XYZ" showing that the operating status is during manufacturing of the product XYZ.

In this way, the energy management system 100 may display energy performance or a collected information for each time boundary for each physical boundary to easily compare the energy performance of the facilities or equipment of equivalent operating statuses.

The displayed energy performance or collected information is displayed based on the time boundary information collected by the information collector 103 to be stored therein and information calculated from a time boundary information based on an energy performance indicator by the energy performance indicator calculation device 106. When upper and lower limit values from an administrative point of view is provided on the energy performance indicator, the upper and lower limit values are set as thresholds, and, based on whether it is within this range or not, normality (OK) or abnormality (NG) of the energy performance is displayed.

For example, information that energy performance is normal (OK) or information indicating abnormality (NG) is displayed. Moreover, background colors of the surface of the spacetime boundaries may be varied between when the energy performance is normal (OK) and it is abnormal (NG) to report that the energy performance is normal (OK), or provide an alert that it is abnormal (NG). When the energy performance is abnormal (NG), the displayed information may be emphasized in a flashing manner to cause the emphasize result to be displayed.

In this way, an observer may accurately identify a location of the abnormal status and may instruct appropriately.

The energy performance or collected information displayed may be a representative value such as mean, a maximum value, etc., a differential, a differential ratio of the management value, standard value. Moreover, a trend information on the energy performance indicator within the time boundary and a dispersion diagram between the energy consumption and the relevant variables may be displayed. Moreover, the energy performance or collected information displayed may be not only a display by number, but also a display by graph or chart.

Moreover, energy performance or a collected information may be arbitrarily displayed on four side faces of the solid of the spacetime boundary which is displayed in a three-dimensional manner. For example, in a spacetime boundary B12 shown in FIG. 8, out of two side faces which can be visually identified out of four side faces, an operating status and a major energy performance indicator are displayed on one side face SD2, while a dispersion chart of the energy consumption and the relevant variables are displayed on the other side SD3.

(Exemplary 3D Display of Hierarchized Spacetime Boundary)

Moreover, the energy performance display control device 105 may show the spacetime boundary as a boundary of the hierarchical structure that is hierarchized on the physical boundary and the time boundary. For example, the spacetime boundary may be hierarchically configured to include the spacetime boundary of multiple lower-level hierarchical structures. The lower-level hierarchy of a certain spacetime boundary includes a lower-level spacetime boundary group which is configured from a lower-level physical boundary group which is divided in more detail by a more detailed equipment or device boundary of a physical boundary in the spacetime boundary and a lower-level time boundary group which is divided in more detail by a more detailed equipment or device operating status boundary. This specific spacetime boundary may be pulled out by an instruction of a supervisor to display the pulled-out result.

Figure 9:
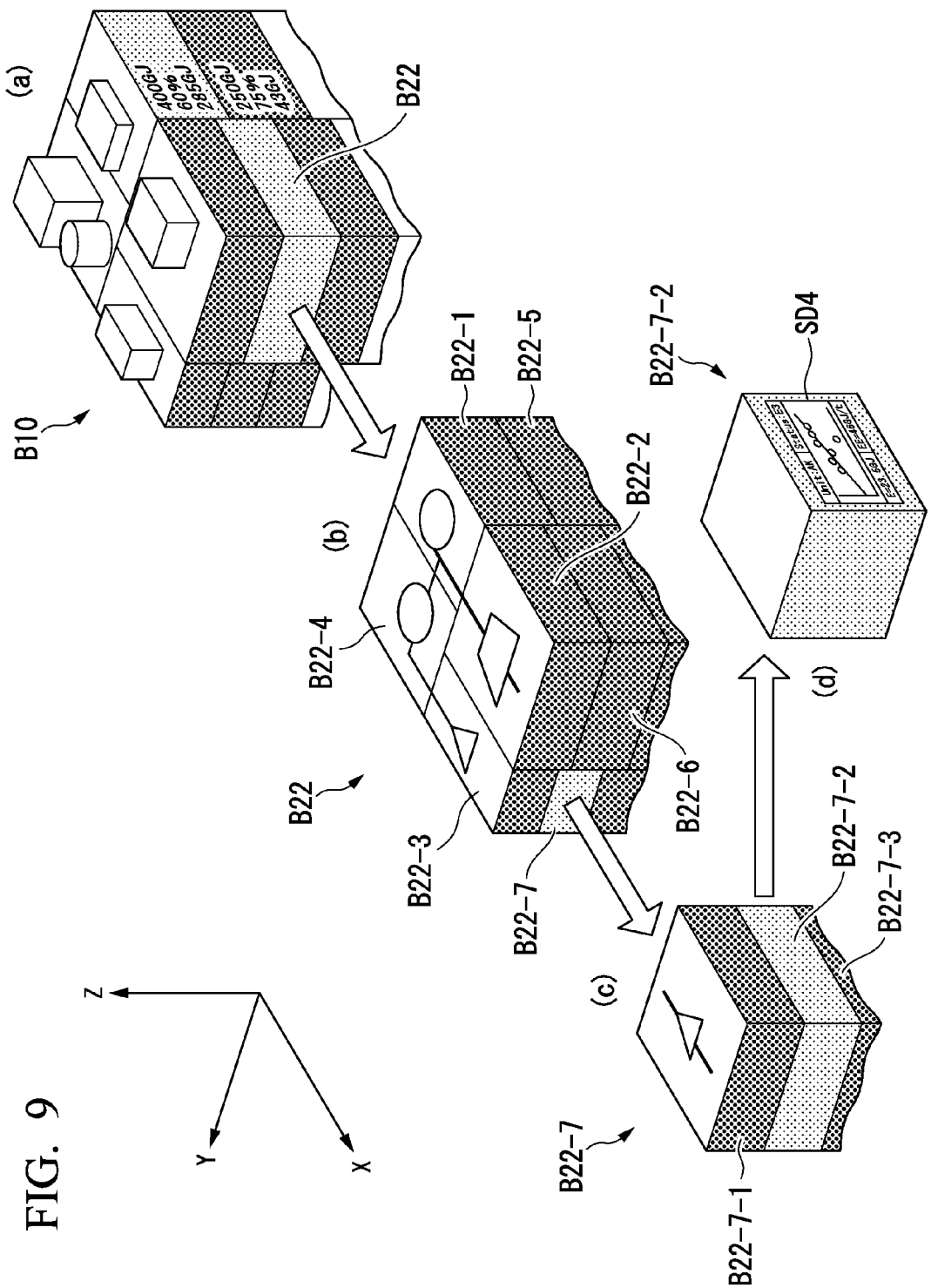
FIG. 9 is a diagram illustrating an exemplary display of a spacetime boundary which is hierarchized according to the present embodiment.

FIG. 9 is a diagram illustrating an exemplary display of a spacetime boundary which is hierarchized. In FIG. 9, the spacetime boundary B10 which is shown with a letter (a) corresponds to the spacetime boundary B10 in FIG. 8. Here, the spacetime boundary B22 is hierarchically configured. This spacetime boundary B22 shows, in a letter (b), what is pulled out by an instruction of a supervisor to be displayed. As shown in letter (b), the spacetime boundary B22 is configured to include multiple lower-level spacetime boundaries (spacetime boundaries B22-1, B22-2, B22-3, B22-4, B22-5, B22-6, B22-7, etc.). Of multiple lower-level spacetime boundaries, the spacetime boundary B22-7 is further configured hierarchically.

A letter (c) represents that the spacetime boundary B22-7 is pulled out by an instruction of a supervisor to cause the pulled out result to be displayed. As shown with the letter (c), the spacetime boundary B22-7 is configured to include three lower-level spacetime boundaries (spacetime boundaries B22-7-1, B22-7-2, B22-7-3). For example, the spacetime boundary B22-7-2 may be designated to pull out the spacetime boundary B22-7-2 to cause the pulled out result (a letter (d)) to be displayed. Then, a detailed information and the operating status of the energy performance are displayed on the side face SD4 of the spacetime boundary B22-7-2. This makes it possible for the observer to check the energy performance or collected information of the spacetime boundary B22-7-2. In this way, according to the energy management system 100 according to the present embodiment, the observer may drill down the energy performance or the collected information and the operating status of the lower level hierarchy of the spacetime boundary B10 to cause the drilled-down result to be displayed to check the displayed result.

In other words, the spacetime boundary B22-7 of equipment (for example, a pump) shown in a triangle of the spacetime boundary B22 in which a time boundary T22 of a physical boundary F12 which is configured with the equipment or the device illustrated on the upper face of (b) in FIG. 9, or in other words, the spacetime boundary B22 called "PRD LMN" (during manufacturing of a product LMN, see FIG. 8) is shown in (c) in FIG. 9. Moreover, the energy performance or collected information of the spacetime boundary B22-7, which is a detail of the spacetime boundary B22-7, is shown in (d) in FIG. 9.

In the energy performance display controller 105, the spacetime boundary may be shown as a boundary of the hierarchical structure which is hierarchized to at least one of the physical boundary and the time boundary.

Figure 10:
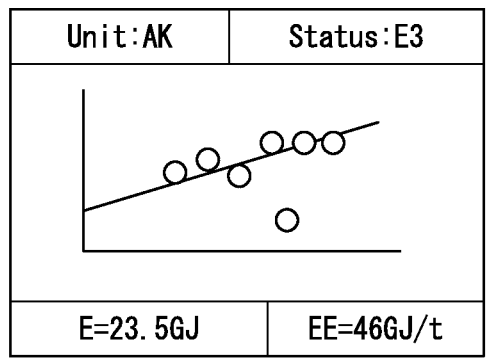
FIG. 10 is an enlarged diagram on information which is displayed on a side face of the spacetime boundary.
Figure 13:
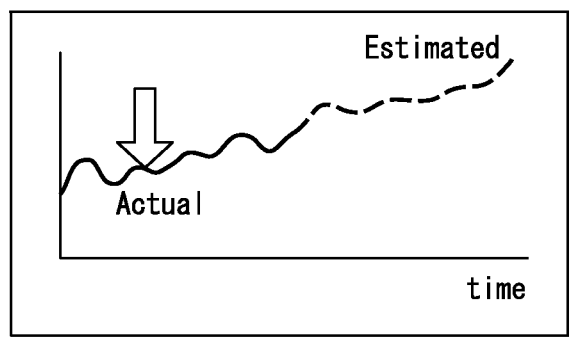
FIG. 13 is a diagram illustrating an estimated value of the energy consumption and a trend chart.

FIG. 10 is an enlarged diagram on information which is displayed on a side face SD4 of the spacetime boundary B22-7-2 in FIG. 9. In an example shown in FIG. 10, the name of the equipment or the device (Unit: AK) of the spacetime boundary B22-7-2, the operating status (Status: E3) thereof, a correlation diagram of output and energy consumption, energy consumption (E=23.5 GJ), energy efficiency (EE=46 GJ/t) are displayed. Moreover, diagrams (see FIGS. 11-12) which show the current operating status of the status transition diagram of the equipment or the device of the spacetime boundary B22-7-2, or a diagram (see FIG. 13) which shows an estimated value, a trend chart of the energy consumption, etc., may be displayed.

The energy performance according to the present embodiment needs to be compared at equivalent conditions. The energy management system 100 may display a spacetime boundary when certain equipment is in a certain specific operating status when manufacturing a certain specific product and a spacetime boundary of the equivalent condition to compare the displayed results. For example, with the energy management system 100, an observer may search, from the 3D displayed spacetime boundaries, a certain spacetime boundary and a spacetime boundary of the condition equivalent to the spacetime boundary to pull out the searched results and cause the pulled-out searched results to be displayed in parallel to intuitively compare the energy performances of the pulled-out searched results. For example, as described with reference to FIG. 9, the energy performances of only the "PRD LMN" of the spacetime boundary B22 may be pulled out and compared. Moreover, the energy management system 100 may further include a function of comparing these on the same energy performance graph. For example, the horizontal axis may be set to time and the energy performance such as the specific energy consumption may be caused to be displayed on the vertical axis to find abnormalities of the process and the equipment.

SUMMARY

As described above, the energy management system 100 according to the present embodiment includes the information collector 103, and the energy performance display controller 105 (one example of the display controller). In accordance with elapsing of time, the information collector 103 collects information (an example of a first unit) on energy performance in which information is included information on energy consumption of the production factory 10 (one example of a subject of energy management) or information on factors involved in changes of the energy consumption. The energy performance display controller 105 causes information (an example of a second information) in which is included specified energy performance or a collected information (a first information collected by the information collector 103, information on energy performance) for each time boundary (an example of a second information) divided by a boundary of the operating status which changes in accordance with elapsing of the time of the production factory 10 for each physical boundary (an example of a first information) divided by a physical or logical boundary of the production factory 10 based on information on energy performance collected by the information collector 103 to be collated to the physical boundary and the time boundary to cause the collated result to be displayed on the display 210.

In this way, the energy management system 100 may display energy performance or a collected information for each time boundary for each physical boundary to easily compare the energy performances of the facilities or equipment of equivalent operating statuses. Therefore, the observer may accurately find the location of an abnormal status and provide an appropriate instruction, for example.

For example, the energy performance display controller 105 may show a third unit (an example of the third unit) in which a physical boundary and a time boundary are combined as a solid shape which is shown with a three-dimensional space which is configured by an X-axis and a Y-axis which are orthogonal that correspond to the physical boundary and a Z-axis which corresponds to the time boundary and converts the spacetime boundary shown as the solid shape to cause the converted result to be displayed on the display 210. Moreover, the energy performance display controller 105 collates the energy performance or the collected information corresponding to the spacetime boundary to the spacetime boundary to cause the collated result to be displayed on the display 210.

In this way, the energy management system 100 may collate the energy performance or the collected information to the spacetime boundary in which the physical boundary and the time boundary are modelled as a solid to cause the collated result to be displayed to allow the observer to intuitively grasp the energy performance for each operating status of the facilities or equipment.

More specifically, the energy performance display controller 105 causes the energy performance or the collected information that corresponds to the spacetime boundary to be displayed on a portion corresponding to a surface (for example, a side face) of the spacetime boundary shown as the solid shape.

In this way, the energy management system 100 may cause the energy performance or the collected information on the surface of the spacetime boundary to be displayed to allow the observer to intuitively grasp the energy performance for each operating status of the facilities or equipment.

The energy performance display controller 105 may cause the energy performance or the collected information corresponding to the spacetime boundary to be displayed on the portion corresponding to the inside of the spacetime boundary. In this case, in the energy performance display controller 105, the side face portion of the spacetime boundary may be made transmittive or semi-transmittive to allow the observer to intuitively grasp the energy performance for each operating status of the facilities or equipment in the same manner as when displaying on the side face.

Moreover, the energy performance display controller 105 shows the spacetime boundary as a boundary of the hierarchical structure (one example of a hierarchical structure unit) which is hierarchized to at least one boundary of the physical boundary and the time boundary.

In this way, the energy management system 100 may drill down details of the spacetime boundary to be focused to cause the drilled-down result to be displayed.

Moreover, the energy performance display controller 105 draws out a lower-level spacetime boundary (one example of a hierarchical structural unit) from a spacetime boundary to cause the drawn-out result to be displayed on the display 210 and collates the energy performance or the collected information that corresponds to the lower-level spacetime boundary to cause the collated result to be displayed.

In this way, the energy management system 100 may drill down the details of the spacetime boundary to be focused to cause the drilled-down result to be displayed to allow the observer to intuitively grasp detailed energy performance for each operating status of the facilities or equipment. Therefore, the observer may check causes of the abnormality status in more detail and provide an appropriate instruction.

For example, the energy performance display controller 105 shows a lower-level spacetime boundary as a solid shape and causes the energy performance or the collected information of the lower-level spacetime boundary to be displayed on a portion corresponding to the surface of this lower-level spacetime boundary shown as a solid.

In this way, the energy management system 100 causes the energy performance or the collected information also for the lower-level spacetime boundary to be displayed on the surface of the lower-level spacetime boundary to thereby allow the observer to intuitively grasp detailed energy performance for each operating status of the facilities or equipment.

Moreover, the energy management system 100 according to the present embodiment may be configured to include a display control apparatus which includes at least an energy performance display controller 105 (one example of a display controller). Based on information (one example of a first information) on energy performance in which is included information on factors involved in changes of the energy consumption or information on the energy consumption of the production factory 10 (one example of the subject of energy management) that is collected in accordance with elapsing of time, the energy performance display controller 105 of the display control apparatus causes information on the energy performance to be displayed on the display 210. More specifically, for each physical boundary (one example of a first unit) which is divided by a physical or logical boundary of the production factory 10, the energy performance display controller 105 causes information (one example of a second information) in which is included specified energy performance or a collected information (information collected by the information collector 103) for each time boundary (one example of a second unit) divided by a boundary of an operating status which changes in accordance with elapsing of time of the production factory 10 to be collated to the physical boundary and the time boundary to cause the collated result to be displayed on the display 210.

In this way, the display control apparatus of the energy management system 100 causes the energy performance or the collected information for each time boundary to be displayed for each physical boundary to easily compare the energy performance of the facilities or equipment of the equivalent operating statuses. Therefore, for example, the observer may accurately find the location of the abnormality status and provide an appropriate instruction.

While the above-described embodiment is arranged to allow intuitive grasping by a 3D display, it may also be arranged to provide a 2D display (two-dimensional display) when the spacetime boundary may easily be identified. For example, a portion of physical boundaries (F11, F12, F13, F14) of the upper face of the spacetime boundary B10 in FIG. 8 is displayed in a 2D display, and an arbitrary physical boundary thereof may be designated by a click operation to collate the energy performance or the collected information for each time boundary in the designated physical boundary to each time boundary to cause the collated result to be displayed in a 2D display. Moreover, a portion of spacetime boundaries (B11, B12, B13, B14) of the upper face of the spacetime boundary B10 in FIG. 8 is displayed in a 2D display, and an arbitrary spacetime boundary thereof may be designated by a click operation to cause the lower-level spacetime boundary to be displayed as a child screen and, at the same time, the energy performance or the collected information of the lower-level spacetime boundary may be collated to the lower-level spacetime boundary to cause the collated result to be displayed in the 2D display.

Some or all of functions of each section provided by the energy management system 100 according to the above-described embodiment that include a function of collating to display the collated result may be realized by a computer system which generally includes a processor. In this case, programs for causing the above-described function may be recorded in a computer-readable recording medium to cause a computer system including the processor to read and execute the programs recorded in this recording medium to thereby realize the above-described functions. The "computer system" herein refers to a computer system embedded in the energy management system 100 and includes the hardware such as the processor, an OS, peripheral equipment, etc.

Moreover, "a computer system" also includes a website provision environment (or a display environment) if the computer system uses a WWW system.

Furthermore, "a computer-readable recording medium" refers to a flexible disk; a magneto-optical disk; a portable medium such as a ROM, a CD-ROM, etc.; a storage apparatus such as a hard disk embedded in a computer system, etc. Moreover, "the computer-readable recording medium" may also include what holds programs dynamically in a short time, such as a communications line for transmitting programs via a communications circuit such as a telephone circuit and a network such as the Internet, etc., what holds programs for a certain time period, such as a volatile memory inside the computer system to be a server or a client in that case. Moreover, the above-described programs may realize some of the above-described functions, or the above-described functions may be realized by combining with programs already recorded in the computer system.

Moreover, some or all of the energy management system 100 in the above-described embodiment may be realized as a semiconductor circuit such as an LSI (Large Scale Integration), etc. The respective function blocks of the energy management system 100 may be individually provided in a processor, or some or all of the respective function blocks may be integrated to provide the integrated result in the processor. Moreover, a technique for circuit integration may include realization of not only an LSI, but also a dedicated circuit or a general purpose processor. Furthermore, when a technique for circuit integration that replaces the LSI by advancement of the semiconductor technology appears, an integrated circuit using the above-described technique may be used.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A system comprising:
    at least one control system configured to control one or more subjects of energy management in a production factory;
    an information collection device configured to collect, over time, from the at least one control system, one or more of energy consumption of the subjects of energy management and relevant variables associated with the energy consumption;
    a physical boundary information storage device that stores a plurality of physical boundaries of the one or more subjects of energy management together with a hierarchical structure of the plurality of physical boundaries, and for each physical boundary, stores physical boundary information including energy consumption data of the physical boundary and relevant variables data associated with the energy consumption, and a status transition table including operating status information of the physical boundary, the physical boundaries being subject ranges of energy management wherein the plurality of physical boundaries includes a higher-level physical boundary at an upper or higher level in the hierarchical structure and a plurality of lower-level physical boundaries at a lower level in the hierarchical structure, and the plurality of lower-level physical boundaries belong to the higher-level physical boundary;

a time boundary information storage device that stores, for each of the physical boundaries, time boundary information including a plurality of time boundaries representing transitions over time of energy performance of the physical boundary;

a display device; and a display control device configured to read the physical boundary information from the physical boundary information storage device and the time boundary information from the time boundary information storage device, to generate display information on energy performance of the production factory according to one or more spacetime boundaries based on the physical boundary information and the time boundary information and according to the status information of the physical boundaries, and to control the display device to display the generated display information, wherein the display control device is configured to control the display device to display the energy performance by the spacetime boundaries as a solid shape, in which the physical boundaries are displayed in an X-axis/Y-axis plane, and the time boundaries are displayed on the Z-axis, and wherein the display control device is configured to control the display device to display the information on the energy performance of the spacetime boundaries on a portion of a surface of the solid shape.

2. The system as claimed in claim 1, wherein
the display control device is configured to control the display device to display the spacetime boundaries separated out according to the hierarchical structure of the physical boundaries.

3. The system as claimed in claim 2, wherein
the display control device is configured to control the display device to display the spacetime boundaries separated out according to the time boundaries.

4. The system as claimed in claim 3, wherein
the display control device is configured to control the display device to display the hierarchical structure as the solid shape, and
the display control device is configured to control the display device to display information of the hierarchical structure on a portion of a surface of the solid shape.

5. The system as claimed in claim 1, wherein the physical boundary is an energy boundary.

6. The system as claimed in claim 1, wherein the physical boundaries are subject ranges of energy management in the production factory, and the subject ranges of energy management comprise one or more of a first range, a second range, a third range, a fourth range, a fifth range, a sixth range, and a seventh range,
wherein the first range includes one or more manufacturing processes, one or more pieces of equipment, and one or more devices for manufacturing a certain product,
wherein the second range includes a factory building within a production factory,
wherein the third range includes one or more manufacturing processes, one or more pieces of equipment, one or more devices for a portion of a step that manufactures the certain product,
wherein the fourth range includes a piece of equipment included in the factory building,
wherein the fifth range includes a plurality of equipment unit groups,
wherein the sixth range includes a device included in the piece of equipment, and
wherein the seventh range includes a plurality of devices included in an equipment unit group.

7. The system as claimed in claim 1, wherein the status information is displayed using shading of the solid shape.

8. A method comprising:
collecting, over time, from at least one control system, one or more of energy consumption of one or more subjects of energy management in a production factory, and relevant variables associated with the energy consumption;

storing, in a physical boundary storage device, a plurality of physical boundaries of the one or more subjects of energy management together with a hierarchical structure of the plurality of physical boundaries, and for each physical boundary, storing physical boundary information including energy consumption data of the physical boundary and relevant variables data associated with the energy consumption, and a status transition table including operating status information of the physical boundary, the physical boundaries being subject ranges of energy management wherein the plurality of physical boundaries includes a higher-level physical boundary at an upper or higher level in the hierarchical structure and a plurality of lower-level physical boundaries at a lower level in the hierarchical structure, and the plurality of lower-level physical boundaries belong to the higher-level physical boundary;

storing, in a time boundary information storage device, for each of the physical boundaries, time boundary information including a plurality of time boundaries representing transitions over time of the energy performance of the physical boundary;

reading the physical boundary information from the physical boundary information storage device and the time boundary information from the time boundary information storage device;

generating display information on energy performance of the production factory according to one or more spacetime boundaries based on the physical boundary information and the time boundary information and according to the status information of the physical boundaries; and controlling a display device to display the generated display information, wherein the display control device is configured to control the display device to display the energy performance by the spacetime boundaries as a solid shape, in which the physical boundaries are displayed in an X-axis/Y-axis plane, and the time boundaries are displayed on the Z-axis, and wherein the display control device is configured to control the display device to display the information on the energy performance of the spacetime boundaries on a portion of a surface of the solid shape.

9. The method as claimed in claim 8, further comprising controlling at least one of the one or more subjects of energy management in the production factory based on the display information on energy performance that is displayed.

10. A system comprising:
    at least one control system configured to control one or more subjects of energy management;
    a collection device configured to collect, over time, energy consumption of the one or more subjects of energy management and variables associated with the energy consumption;
    a first storage device that stores a plurality of subject ranges of energy management together with a hierarchical structure of the plurality of subject ranges, and for each subject range, energy consumption of the subject range, variables associated with the energy consumption, and operating status transitions over time of the plurality of subject ranges, wherein the one or more subjects of energy management are divided into the plurality of subject ranges by one or more physical or logical boundaries, and wherein the plurality of subject ranges includes a higher-level subject range at an upper or higher level in the hierarchical structure and a plurality of lower-level subject ranges at a lower level in the hierarchical structure, and the plurality of lower-level subject ranges belong to the higher-level subject range;
    a second storage device that stores, for each of the subject ranges, a plurality of time boundaries representing transitions over time of the energy performance of the subject ranges;
    a display device; and
    a display control device configured to collate energy information by time boundaries and subject ranges to generate energy performance information according to spacetime boundaries, and to control the display device to display the energy information according to the spacetime boundaries, along with the operating status transitions over time of the subject ranges,
    wherein the display control device is configured to control the display device to display the energy performance by the spacetime boundaries as a solid shape, in which the physical boundaries are displayed in an X-axis/Y-axis plane, and the time boundaries are displayed on the Z-axis, and
    wherein the display control device is configured to control the display device to display the information on the energy performance of the spacetime boundaries on a portion of a surface of the solid shape.

11. The system as claimed in claim 10, wherein the first storage device and the second storage device are a same storage device.

12. The system as claimed in claim 10, wherein the subject ranges of energy management comprise one or more of a first range, a second range, a third range, a fourth range, a fifth range, a sixth range, and a seventh range,
    wherein the first range includes one or more manufacturing processes, one or more pieces of equipment, and one or more devices for manufacturing a certain product,
    wherein the second range includes a factory building within a production factory,
    wherein the third range includes one or more manufacturing processes, one or more pieces of equipment, one or more devices for a portion of a step that manufactures the certain product,
    wherein the fourth range includes a piece of equipment included in the factory building,
    wherein the fifth range includes a plurality of equipment unit groups,
    wherein the sixth range includes a device included in the piece of equipment, and
    wherein the seventh range includes a plurality of devices included in an equipment unit group.

13. A system comprising:
    at least one control system configured to control one or more subjects of energy management in a production factory;
    an information collection device configured to collect, over time, from the at least one control system, one or more of energy consumption of the subjects of energy management and relevant variables associated with the energy consumption;
    a physical boundary information storage device that stores a plurality of physical boundaries of the one or more subjects of energy management together with a hierarchical structure of the plurality of physical boundaries, and for each physical boundary, stores physical boundary information including energy consumption data of the physical boundary and relevant variables data associated with the energy consumption, and a status transition table including operating status information of the physical boundary, the physical boundaries being subject ranges of energy management wherein the plurality of physical boundaries includes a higher-level physical boundary at an upper or higher level in the hierarchical structure and a plurality of lower-level physical boundaries at a lower level in the hierarchical structure, and the plurality of lower-level physical boundaries belong to the higher-level physical boundary;
    a time boundary information storage device that stores, for each of the physical boundaries, time boundary information including a plurality of time boundaries representing transitions over time of energy performance of the physical boundary;
    a display device; and
    a display control device configured to read the physical boundary information from the physical boundary information storage device and the time boundary information from the time boundary information storage device, to generate display information on energy performance of the production factory according to one or more spacetime boundaries based on the physical boundary information and the time boundary information and according to the status information of the physical boundaries, and to control the display device to display the generated display information,
    wherein the display control device is configured to control the display device to display the energy performance by the spacetime boundaries as a solid shape, in which the physical boundaries are displayed in an X-axis/Y-axis plane, and the time boundaries are displayed on the Z-axis, and,
    wherein the display control device is configured to control the display device to display information on first energy performance of a first spacetime boundary of the plurality of spacetime boundaries as a three-dimensional solid shape and information on second energy performance of a second spacetime boundary of the plurality of spacetime boundaries in parallel, the first spacetime boundary being equivalent to the second spacetime boundary.

14. The system according to claim 13, wherein the display control device is configured to control the display device to display the information on the first energy performance of the first spacetime boundary and the information on the second energy performance of the second spacetime boundary on a same energy performance graph.

* * * * *